US010746397B1

(12) United States Patent
Ono

(10) Patent No.: US 10,746,397 B1
(45) Date of Patent: Aug. 18, 2020

(54) COMBUSTION APPARATUS

(71) Applicant: RINNAI CORPORATION, Aichi (JP)

(72) Inventor: Takahiro Ono, Nagoya (JP)

(73) Assignee: RINNAI CORPORATION, Aichi (JP)

(*) Notice: Subject to any disclaimer, the term of this patent is extended or adjusted under 35 U.S.C. 154(b) by 309 days.

(21) Appl. No.: 16/063,769

(22) PCT Filed: Oct. 3, 2016

(86) PCT No.: PCT/JP2016/004449
§ 371 (c)(1),
(2) Date: Jun. 19, 2018

(87) PCT Pub. No.: WO2017/110020
PCT Pub. Date: Jun. 29, 2017

(30) Foreign Application Priority Data

Dec. 25, 2015 (JP) .................................. 2015-253498

(51) Int. Cl.
*F23D 14/78* (2006.01)
*F23M 5/08* (2006.01)
*F24H 1/14* (2006.01)

(52) U.S. Cl.
CPC ............... *F23D 14/78* (2013.01); *F23M 5/08* (2013.01); *F24H 1/14* (2013.01)

(58) Field of Classification Search
CPC ........ F23D 14/78; F23D 14/145; F23D 14/14; F23D 14/02; F23D 14/36; F23D 2900/14001; F23M 5/08; F24H 1/14; F24H 9/02; F24H 9/148; F24H 1/40; F24H 1/0027; Y02E 20/366
See application file for complete search history.

(56) References Cited

U.S. PATENT DOCUMENTS

| | | | | |
|---|---|---|---|---|
| 4,389,980 A | * | 6/1983 | Marcotte | ............... F24D 11/002 122/114 |
| 4,541,410 A | * | 9/1985 | Jatana | ..................... F23C 3/004 122/121 |
| 6,159,001 A | * | 12/2000 | Kushch | ................... F23D 14/12 122/4 D |

FOREIGN PATENT DOCUMENTS

| | | | |
|---|---|---|---|
| DE | 3608698 | * | 7/1987 |
| EP | 0373027 | * | 6/1990 |
| JP | 57-190335 U | | 12/1982 |

(Continued)

OTHER PUBLICATIONS

International Search Report and Written Opinion for PCT Patent App. No. PCT/JP2016/004449 (dated Dec. 27, 2016) with English translation of the ISR.

*Primary Examiner* — Alfred Basichas
(74) *Attorney, Agent, or Firm* — Cermak Nakajima & McGowan LLP; Tomoko Nakajima

(57) ABSTRACT

In a combustion apparatus including a burner, a combustion box on a lower side of the burner and enclosing a heat exchanger, and a water jacket in the combustion box and connected to a downstream side of the heat exchanger, the water jacket is arranged to connect together an inlet jacket part disposed in one lateral-side side plate of the combustion box, and an outlet jacket part having a hot water outlet port through jacket parts disposed in the other side plates of the combustion box. An extension jacket part is disposed so as to be elongated from an upper part of the outlet jacket part toward the inlet jacket part and formed such that a sectional center of a tip is positioned below a sectional center of the hot water outlet port.

2 Claims, 6 Drawing Sheets

(56) References Cited

FOREIGN PATENT DOCUMENTS

| | | |
|---|---|---|
| JP | 63-168757 U | 11/1988 |
| JP | 10-267414 A | 10/1998 |
| JP | 2004-278983 A | 10/2004 |
| JP | 2004-347230 A | 12/2004 |

* cited by examiner

COMBUSTION APPARATUS

This application is a national phase entry under 35 U.S.C. § 371 of PCT Patent Application No. PCT/JP2016/00449, filed on Oct. 3, 2016, which claims priority under 35 U.S.C. § 119 to Japanese Patent Application No. 2015-253498, filed Dec. 25, 2015, both of which are incorporated by reference.

TECHNICAL FIELD

The present invention relates to a combustion apparatus provided with: a burner for ejecting air-fuel mixture downward; a combustion box which is disposed under the burner in order to enclose the combustion space of the air-fuel mixture to be ejected from the burner; and a heat exchanger disposed in a lower part inside the combustion box.

BACKGROUND ART

Conventionally, as this kind of combustion apparatus, there is known an apparatus in Patent Document 1 in which, in order to improve the heat resistivity of the combustion box, a water jacket as a cooling means for cooling the combustion box is disposed in that portion of the combustion box which lies between the burner and the heat exchanger. The water jacket is constituted by: a laterally elongated first jacket part disposed on one of the front-side and the rear-side side plates of the combustion box; a laterally elongated third jacket part disposed on the other of the front-side and the rear-side side plates of the combustion box; a second jacket part which is elongated in the front side and the rear side and which is disposed on laterally one-side side plate of the combustion box, and which connects the first jacket part and the third jacket part together; an inlet-side jacket part which is disposed in a portion closer to one of the front-side and the rear-side side plates of laterally the other-side side plate of the combustion box and which introduces the water passed through the heat exchanger to the first jacket part; and an outlet-side jacket part which is disposed in a portion closer to the front-side and the rear-side side-plates of the combustion box and into which the water from the third jacket part flows. A hot water outlet port is provided, at an upper part thereof, with an outlet-side jacket part.

It is thus so arranged that the water passed through the heat exchanger flows from the inlet-side jacket part through the first jacket part, the second jacket part, and the third jacket part, to the outlet-side jacket part, and thus water (hot water) can be supplied from the hot-water outlet port to the hot water passage which is connected to the hot-water outlet port. Further, in this example, a fourth jacket part is disposed in a manner to be elongated in longitudinally one side from an upper part of the outlet-side jacket part toward an inlet-side jacket part. That portion of laterally the other-side (the other-side) side plate of the combustion box which lies between the inlet-side jacket part and the outlet-side jacket part is arranged to be cooled by the fourth jacket part.

By the way, there are cases where a part of the heat absorbing tubes is locally overheated (boiled) and, consequently, gives rise to generation of air bubbles in the heat absorbing tubes of the heat exchanger. These air bubbles are carried by the water flow to thereby flow down to the outlet-side jacket part. In this connection, conventionally, the fourth jacket part is elongated horizontally from an upper part of the outlet-side jacket part toward longitudinally one side. In addition, the sectional center of the tip closer to the inlet-side jacket part of the fourth jacket part is positioned at a height equivalent to the sectional center of hot water outlet port. Therefore, if the air bubbles flow into the fourth jacket part without being discharged out of the outlet-side jacket part, the air bubbles are likely to get accumulated in the fourth jacket part. Then, since that portion of the fourth jacket part in which the air bubbles get accumulated can no longer be cooled by water, the temperature therein will increase and consequently the scales are likely to get accumulated, resulting in deterioration of the durability.

PRIOR ART DOCUMENT

Patent Document

Patent Document 1: Specification of EP-A-2811141

SUMMARY OF THE INVENTION

Problems that the Invention is to Solve

In view of the above-mentioned points, this invention has a problem of providing a combustion apparatus in which air bubbles can be prevented from staying in the fourth jacket part.

Means for Solving the Problems

In order to solve the above-mentioned problem, this invention is a combustion apparatus comprising: a burner for ejecting air-fuel mixture downward; a combustion box which encloses a combustion space of the air-fuel mixture ejected from the burner and which is disposed on a lower side of the burner; and a heat exchanger disposed in a lower part inside the combustion box. A water jacket as a cooling means for cooling the combustion box is disposed in that portion of the combustion box which lies between the burner and the heat exchanger. The water jacket is constituted by: a laterally elongated first jacket part disposed on one of front-side and rear-side side-plates of the combustion box; a laterally elongated third jacket part disposed on the other of the front-side and rear-side side-plates of the combustion box; a second jacket part which is disposed on laterally one-side side-plate of the combustion box and which is elongated in the front-and-rear direction for connecting the first jacket part and the third jacket part together; an inlet-side jacket part which is disposed in a portion closer to one of the front-side and rear-side side-plates of the laterally other side of combustion box and which introduces the water passed through the heat exchanger to the first jacket part; an outlet-side jacket part which is disposed in a portion closer to the other of the front-side and rear-side side-plates of laterally the other side of the combustion box and into which the water from the third jacket part flows. A hot water outlet port is disposed in an upper part of the outlet-side jacket part, and a fourth jacket part is disposed so as to be elongated in one of the front-side and rear-side from an upper part of the outlet-side jacket part toward a position close to the inlet-side jacket part. The combustion apparatus is characterized in that the fourth jacket part is formed such that a sectional center of a tip closer to the inlet-side jacket part is positioned below a sectional center of the hot-water outlet port.

According to this invention, by providing a difference in height between the hot water outlet port and the tip of the fourth jacket part, natural convection will be accelerated inside the fourth jacket part. Therefore, even if the air bubbles due to local heating flow into the fourth jacket part, these air bubbles will be conveyed to the hot-water outlet by the flow of the natural convection. It is thus possible to restrain the air bubbles from getting accumulated in the fourth jacket part. As a result, the fourth jacket part can be prevented from getting deteriorated in durability as a result of accumulation of scales due to temperature rise by the accumulation of air bubbles.

In addition, in this invention, preferably an upper surface of the fourth jacket part is formed in an inclined surface which is inclined upward from the said tip toward the upper surface of the portion having disposed therein the hot water outlet port of the outlet-side jacket part. According to this arrangement, the air bubbles become more easily flow along the upper surface of the fourth jacket part toward the outlet-side jacket part. The air bubbles can thus be more effectively prevented from staying in the fourth jacket part.

EMBODIMENT FOR CARRYING OUT THE INVENTION

Figure 1:
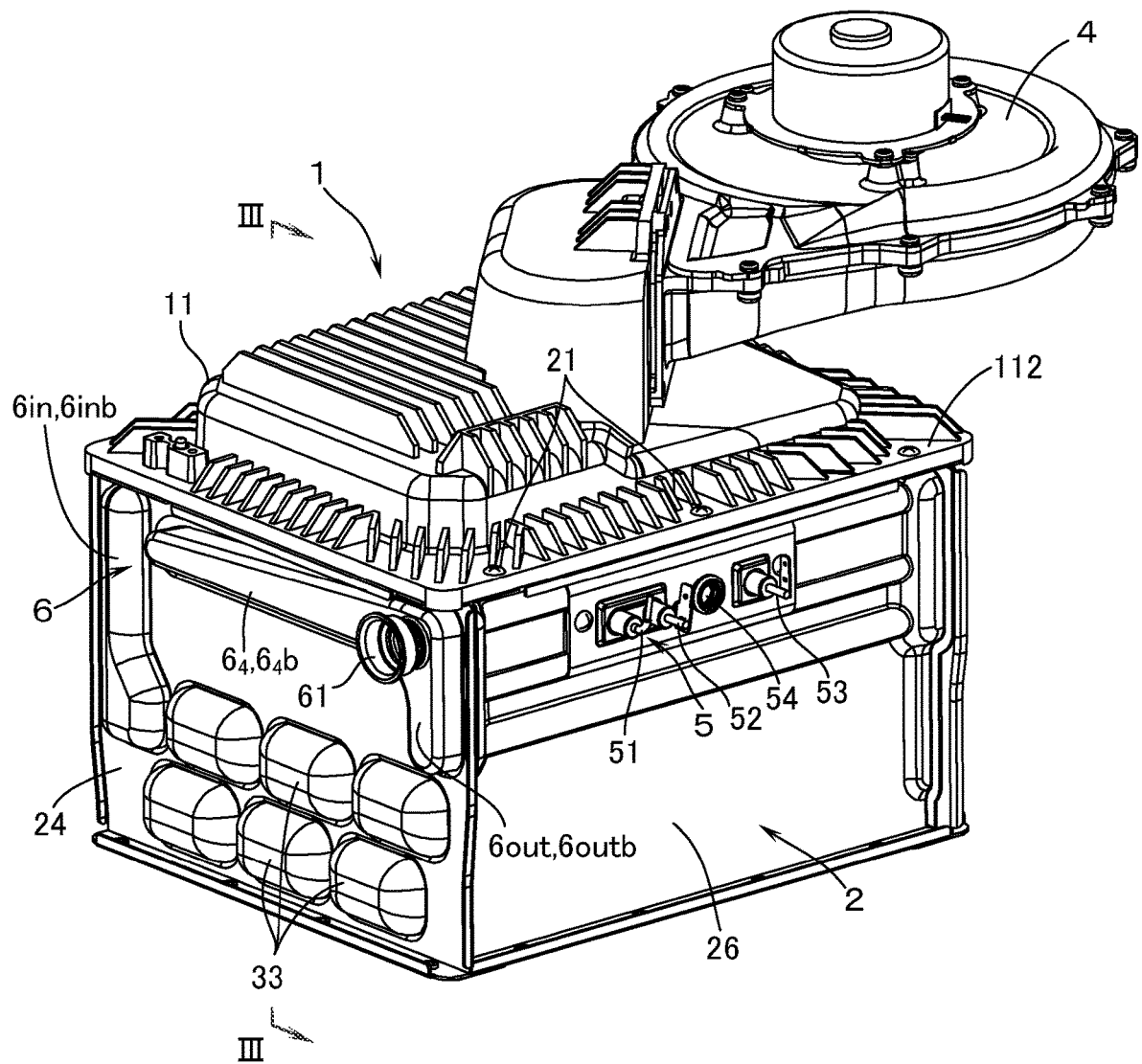
FIG. 1 is a perspective view of a combustion apparatus of an embodiment of this invention.
Figure 2:
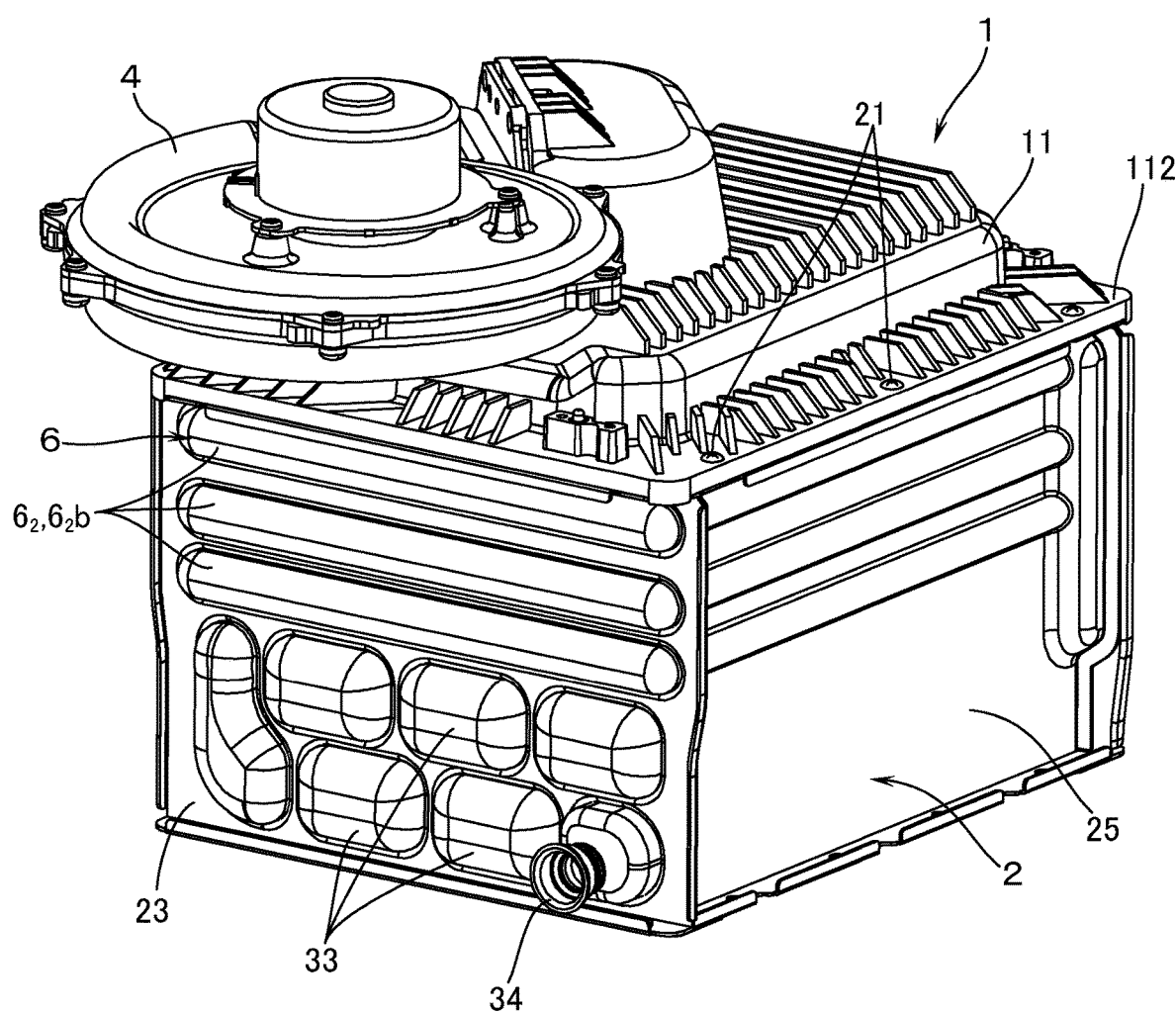
FIG. 2 is a perspective view of the combustion apparatus of the embodiment as viewed from a side opposite to that in FIG. 1.
Figure 3:
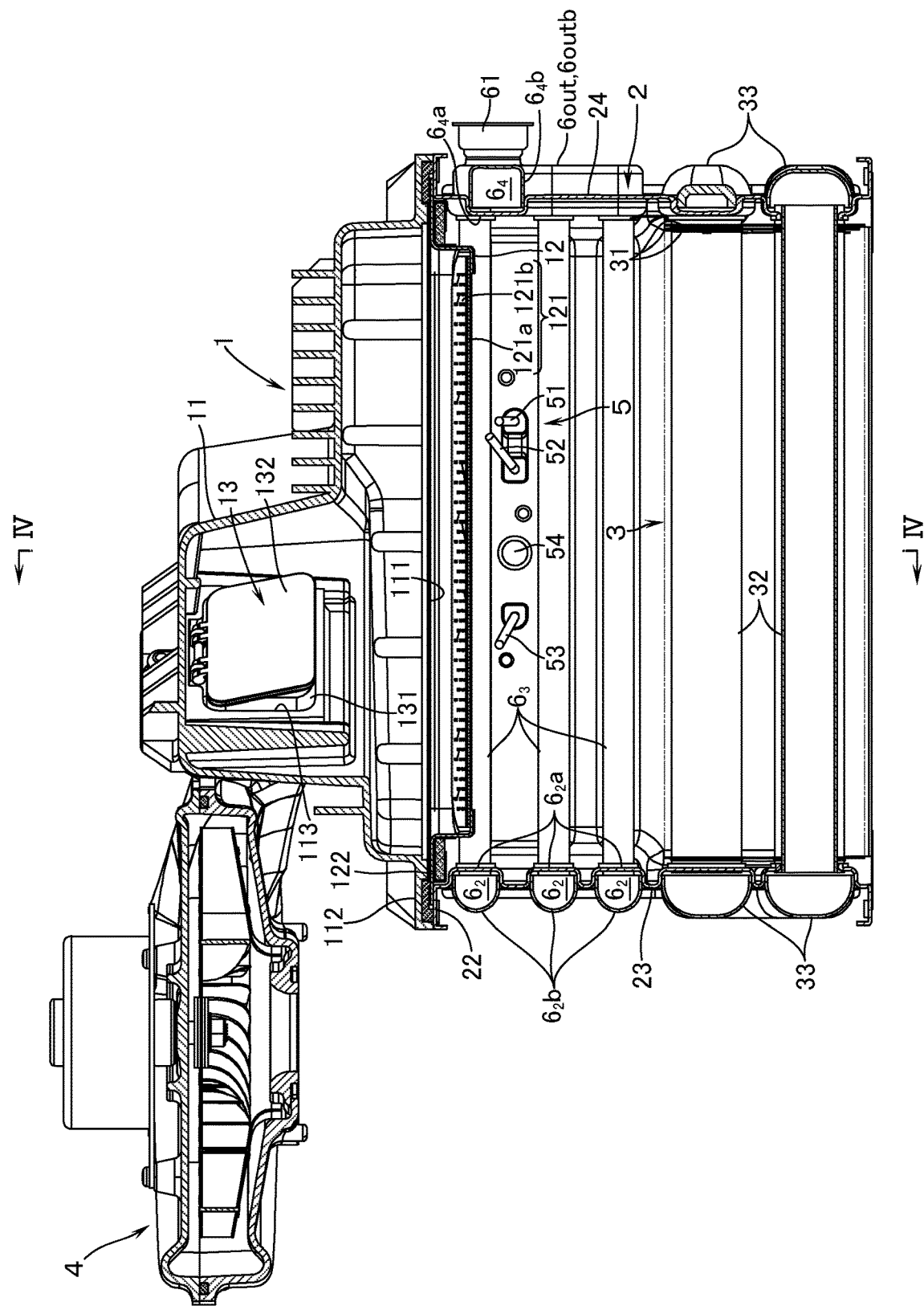
FIG. 3 is a sectional view cut away along the line III-III in FIG. 1.
Figure 4:
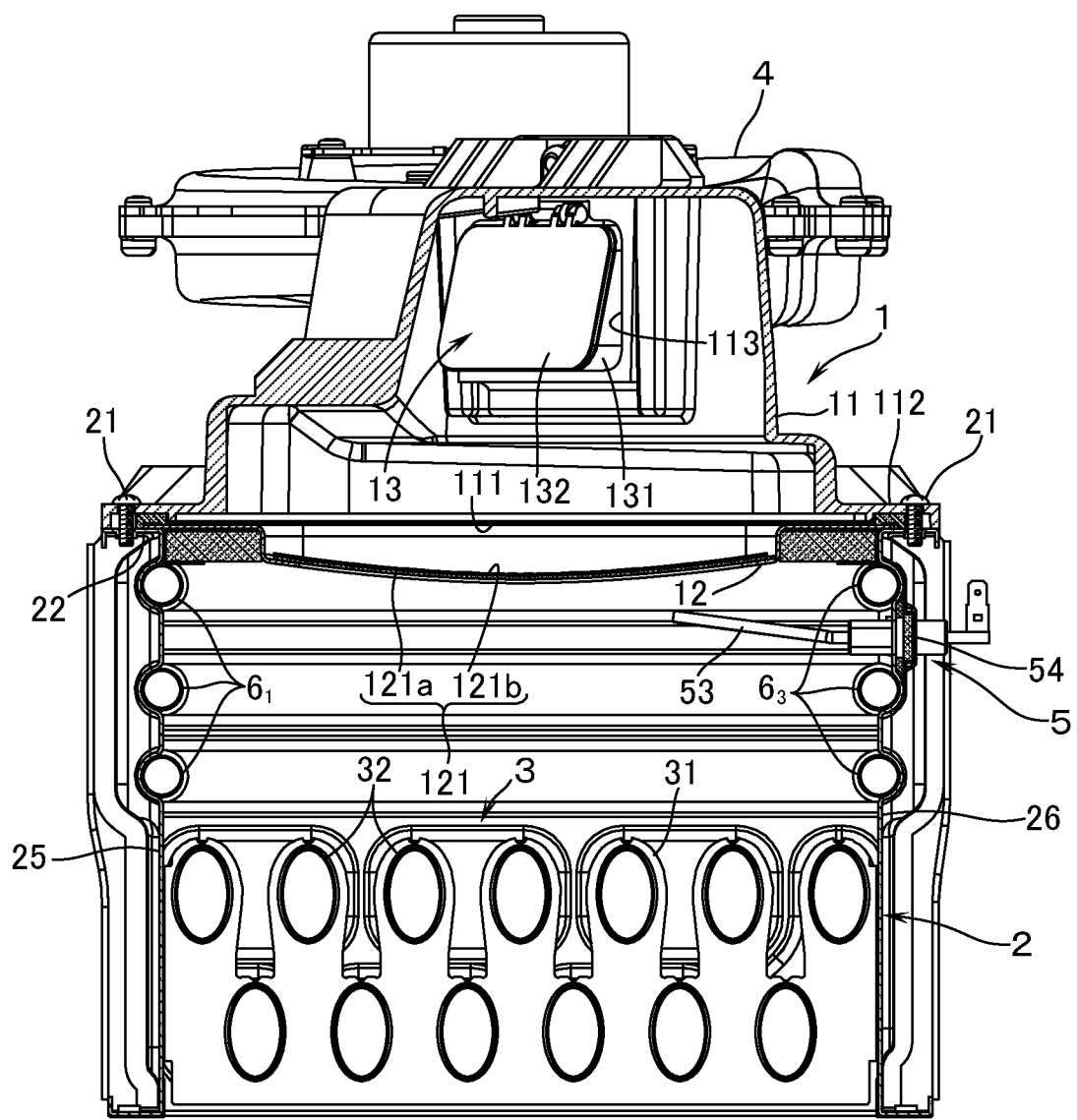
FIG. 4 is a sectional view cut away along the line IV-IV in FIG. 3.

With reference to FIG. 1 to FIG. 4, a combustion apparatus according to an embodiment of this invention is provided with: a burner 1 made up of a burner body 11 which is supplied inside thereof with air-fuel mixture (mixture gas of fuel gas and primary air), and a sheet-metal combustion plate 12 which covers a downward open surface 111 of the burner body 11 so that the air-fuel mixture is ejected downward from an air-fuel mixture ejection part 121 disposed in the combustion plate 12; and a combustion box 2 which is located on the lower side of the burner 1 and which encloses the combustion space for the air-fuel mixture to be ejected from the burner 1. In addition, in a lower part inside the combustion box 2, there is housed a heat exchanger 3 for supplying hot water. Further, on an upper end part of the combustion box 2, there is disposed a connection flange part 22 which is coupled, with machine screws 21, to a body flange part 112 which encloses an open surface of the burner body 11. Then, between the connection flange part 22 and the body flange part 112, there is sandwiched a combustion plate flange part 122 on a rim of the combustion plate 12.

The burner body 11 has opened therein an inlet port 113 to which is connected a fan 4 for supplying air-fuel mixture. The inlet port 113 has mounted therein a check valve 13 which prevents, at the time of fan 4 stopping, the air-fuel mixture staying inside the burner body 11 from flowing back toward the fan 4. The check valve 13 is constituted by: a resin valve box 131 to be fitted into the inlet port 113; and a resin valve plate 132 mounted in that opening of the valve box 131 which faces inside the burner body 11 so as to be swingable about an axis between opened posture and closed posture. Further, the combustion plate 12 has a large opening in the center thereof. This opening has mounted therein a canvass 121a made of heat-resistant fiber 121a and mounted thereon, in a manner overlapping each other, a distribution plate 121b which has formed therein a multiplicity of distribution holes. The air-fuel mixture ejection part 121 is thus constituted by the canvass 121a and the distribution plate 121b. The air-fuel mixture supplied by the fan 4 into the burner body 11 is ejected out of the air-fuel mixture ejection part 121 to thereby perform totally primary air combustion. By the way, it is also possible to form a multiplicity of burner ports in the combustion plate having no large opening so that these burner ports constitute the air-fuel mixture ejection part.

The heat exchanger 3 is constituted by a fin-tube type of heat exchanger having: a multiplicity of fins 31; and a plurality of heat absorbing tubes 32 which penetrate through these fins 31. On outside surfaces of laterally one-side side plate 23 and the other-side side plate 24 of the combustion box 2, there are mounted a plurality of connection covers 33 which define, together with each of the side plates 23, 24, connection passages for the adjoining two heat absorbing tubes 32, 32. By means of these connection passages, all of the heat absorbing tubes 32 are connected in series with each other. In addition, a water inlet port 34 is disposed in the connection cover 33 which defines, between the laterally one-side side plate 24, a connection passage to be connected to an upstream-end heat-absorbing tube 32.

The front-side side plate 26 of the combustion box 2 has mounted thereon an electrode component 5 having an ignition electrode 51, a ground electrode 52, and a flame rod 53 which penetrate the side plate to protrude into the combustion box 2. By the way, the electrode component 5 is additionally provided with an inspection window 54 which enables visual confirmation inside the combustion box 2.

Figure 6:
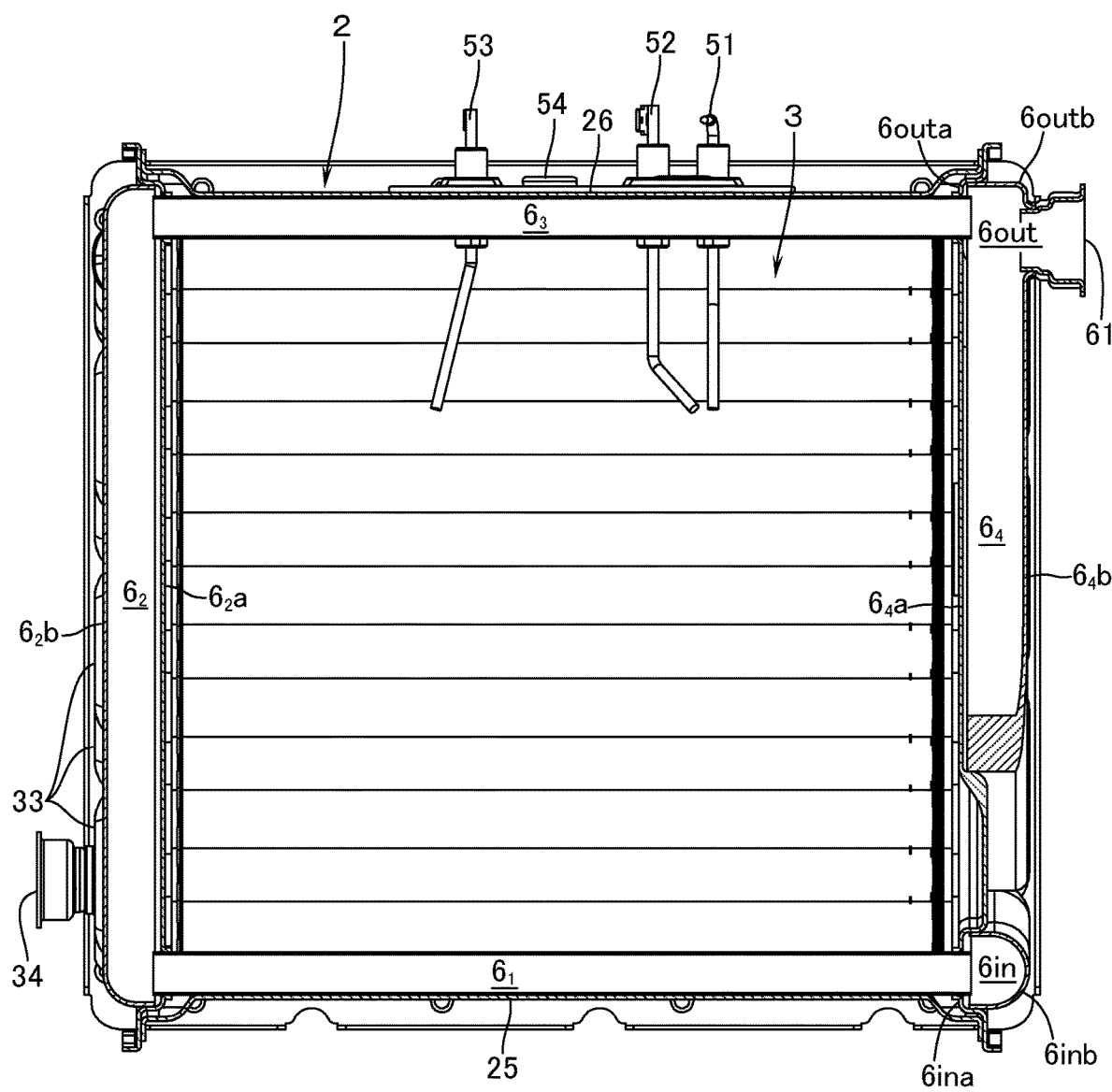
FIG. 6 is a sectional view cut away along the line VI-VI in FIG. 5.

In addition, in that portion of the combustion box 2 which lies between the burner 1 and the heat exchanger 3, there is disposed a water jacket 6 as a cooling means for cooling the combustion box 2. This water jacket 6 is constituted by: first jacket part $6_1$ made up of three pieces of vertically arranged water tubes disposed on one of the front-side and the rear-side side plates of the combustion box 2, e.g., on the rear-side side plate 25 in a manner to be elongated laterally; third jacket part $6_3$ made up of three pieces of vertically arranged water tubes disposed on the other side plate of the front-side and the rear-side side plates of the combustion box 2, e.g., on the front-side side plate 26 in a manner to be elongated laterally; three pieces of vertically arranged second jacket part $6_2$ disposed on the laterally one-side side plate 23 of the combustion box 2, and elongated in one of the front-side and the rear-side for connecting together, as shown in FIG. 6, the three pieces of vertically arranged first jacket part $6_1$ and the three pieces of vertically arranged third jacket part $6_3$; vertically elongated inlet-side jacket part 6in disposed in that portion of laterally the other-side side plate 24 which is closer to the rear side of the side plate 24 of the combustion box 2, for introducing the water passed through the heat exchanger 3 into the vertically arranged three pieces first jacket part $6_1$; and vertically elongated outlet-side jacket part 6out into which the water from the vertically arranged three pieces of third jacket part $6_3$ flows disposed in that portion of laterally the other-side side plate 24 of the combustion box 2. At an upper part of the outlet-side jacket part 6out, there is disposed a hot water outlet port 61 which is laterally open for connection thereto a hot water supply passage. According to this arrangement, the water passed through the heat exchanger 3 (hot water) flows from the inlet-side jacket part 6in toward the outlet-side jacket part 6out through the first jacket part $6_1$, the second jacket part $6_2$ and the third jacket part $6_3$ and then supplied from the hot water outlet port 61 to the hot water supply passage.

By the way, the second jacket part $6_2$ is constituted by: a laterally inward dent $6_2a$ formed in the laterally one-side side plate 23 of the combustion box 2; and a cover plate $6_2b$ which covers this dent $6_2a$. Each of the inlet-side and the outlet-side jacket parts 6in, 6out is also constituted by: laterally inward dents 6ina, 6outa formed in laterally the other side of side plate 24 the combustion box 2; and cover plates 6inb, 6outb which cover the dents 6ina, 6outa.

Now, the rear-side side plate 25, the laterally one-side side plate 23, and the front-side side plate 26 of the combustion box 2 are cooled by the water that flows through the first jacket part $6_1$, the second jacket part $6_2$, and the third jacket $6_3$, respectively. In addition, laterally the other-side side plate 24 of the combustion box 2 is provided with a fourth jacket part $6_4$ which is elongated backward from an upper part of the outlet-side jacket part 6out toward a nearby position of the inlet-side jacket part 6in. According to this arrangement, the portion between both the jacket parts 6in, 6out on the inlet side and the outlet side of laterally the other-side side plate 24 of the combustion box 2 will be cooled by the water inside the fourth jacket part $6_4$. By the way, the fourth jacket part $6_4$ is constituted by a laterally inward dent $6_4a$ which is formed in the side plate 24, and a cover plate $6_4b$ which covers the dent $6_4a$. Then, the dent $6_4a$ in the fourth jacket part $6_4$ and the cover plate $6_4$ are in continuation with the dent 6outa and the cover plate 6outb.

By the way, in case the fourth jacket part $6_4$ is elongated from the upper part of the outlet-side jacket part 6out backward horizontally, when the air bubbles generated by local heating flow from the outlet-side jacket part 6out into the fourth jacket part $6_4$, the air bubbles are likely to get accumulated in the fourth jacket part $6_4$. Then, since the portion in which the air bubbles have been accumulated can no longer be cooled by the water, the temperature will rise and the scales are likely to get accumulated, thereby resulting in the deterioration in durability.

Figure 5:
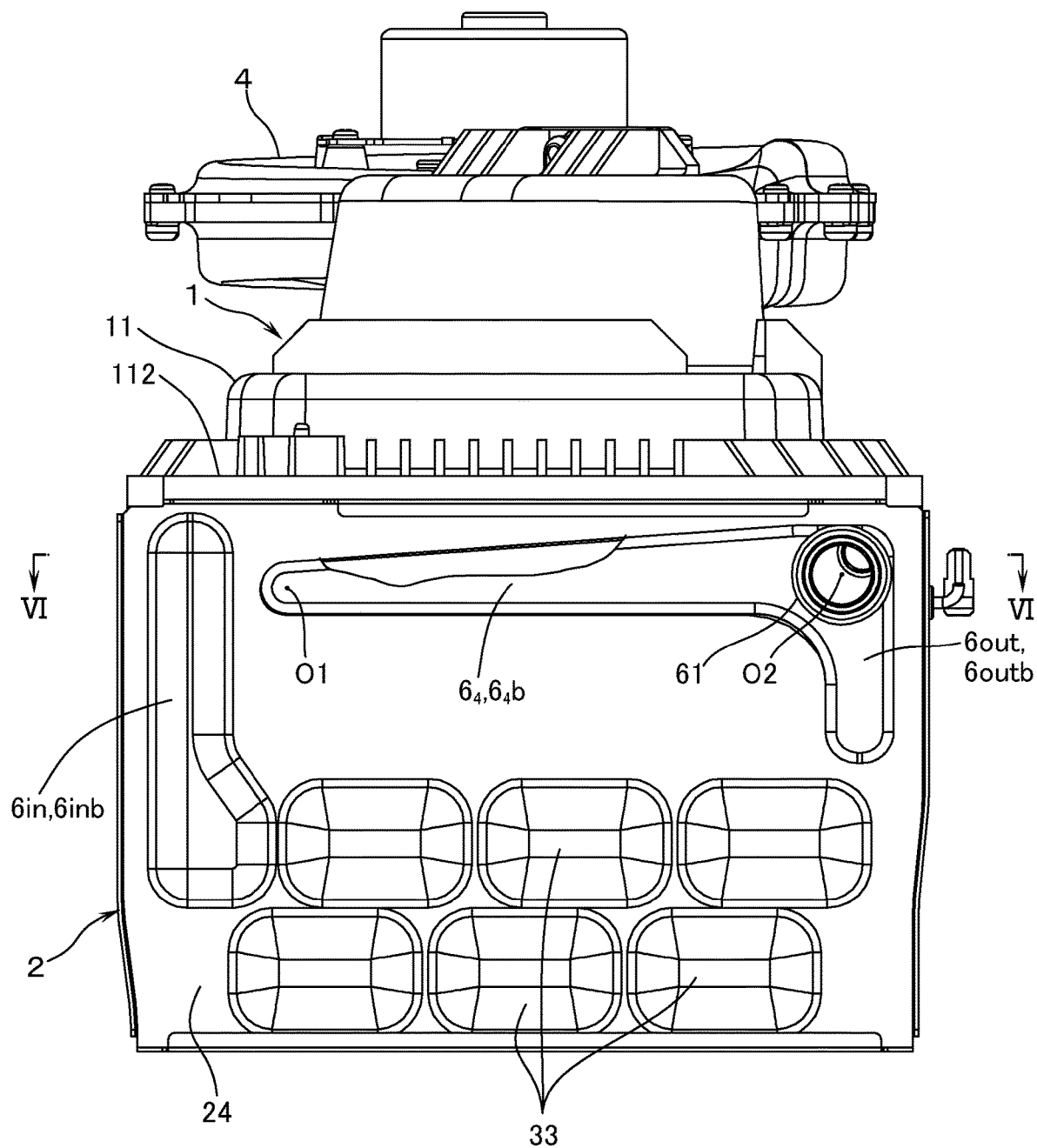
FIG. 5 is a side view of the combustion apparatus as viewed from laterally the other side of the embodiment.

As a solution, in this embodiment, as clearly shown in FIG. 5, the fourth jacket part $6_4$ is formed as follows. A sectional center O1 of that tip of the fourth jacket part $6_4$ which is close to the inlet-side jacket part 6in is positioned below the sectional center O2 of the hot water outlet port 61. According to this arrangement, a difference in elevation is secured between the hot water outlet port 61 and the tip end of the fourth jacket part $6_4$, thereby accelerating the natural convection inside the fourth jacket part $6_4$. Therefore, even if the air bubbles due to local heating flow into the fourth jacket part $6_4$, these air bubbles will be carried toward the hot water outlet port 61 by the flow due to natural convection. Therefore, the air bubbles can be restrained from getting accumulated in the fourth jacket part $6_4$. Accordingly, the fourth jacket part $6_4$ can be prevented from getting deteriorated in durability as a result of accumulation of scales due to temperature rise in the fourth jacket part $6_4$.

Furthermore, according to this embodiment, the upper surface of the fourth jacket part $6_4$ is formed in an inclined surface which is inclined upward from the tip closer to the inlet-side jacket part toward the upper surface of the portion having disposed therein the hot water outlet port 61 of the outlet-side jacket part 6out. Therefore, the air bubbles come to be easily fluidized along the upper surface of the fourth jacket part $6_4$ toward the hot water outlet port 61 side. As a result, the air bubbles can be more effectively prevented from staying in the fourth jacket part $6_4$.

Descriptions have so far been made of embodiments of this invention with reference to the drawings, but this invention shall not be limited to the above. For example, in the above-mentioned embodiments, the heat exchanger 3 for hot water supply is housed in the combustion box 2, but a heat exchanger for purposes other than for hot water supply, e.g., for space heating and the like, may similarly be housed in the combustion box 2.

EXPLANATION OF MARKS

| | | | |
|---|---|---|---|
| 1 | burner | 2 | combustion box |
| 23 | laterally one-side side plate | | |
| 24 | laterally the other-side side plate | | |
| 25 | side plate on rear side (one of front-side and the rear-side) | | |
| 26 | side plate on front side (the other of front-side and the rear-side) | | |
| 3 | heat exchanger | 6 | water jacket |
| 6in | inlet-side jacket part | 6out | outlet-side jacket part |
| $6_1$ | first jacket part | $6_2$ | second jacket part |
| $6_3$ | third jacket part | $6_4$ | fourth jacket part |
| 61 | hot water outlet port | | |
| O1 | sectional center of tip of fourth jacket part | | |
| O2 | sectional center of hot water outlet port | | |

The invention claimed is:

1. A combustion apparatus comprising:
a burner for ejecting air-fuel mixture downward; a combustion box which encloses a combustion space of the air-fuel mixture ejected from the burner and which is disposed on a lower side of the burner; and a heat exchanger disposed in a lower part inside the combustion box,
wherein a water jacket as a cooling means for cooling the combustion box is disposed in that portion of the combustion box which lies between the burner and the heat exchanger, the water jacket being constituted by:
a laterally elongated first jacket part disposed on one of front-side and rear-side side-plates of the combustion box;
a laterally elongated third jacket part disposed on the other of the front-side and the rear-side side-plates of the combustion box;
a second jacket part which is disposed on laterally one-side side-plate of the combustion box and which is elongated in the front-and-rear direction for connecting the first jacket part and the third jacket part together;
an inlet-side jacket part which is disposed in a portion closer to one of the front-side and rear-side side-plates of laterally the other side of combustion box and which introduces the water passed through the heat exchanger to the first jacket part;
an outlet-side jacket part which is disposed in a portion closer to the other of the front-side and rear-side side-plates of laterally the other side of the combustion box and into which the water from the third jacket part flows;
wherein a hot water outlet port is disposed in an upper part of the outlet-side jacket part, and a fourth jacket part is disposed so as to be elongated in one of the front-side and rear-side from an upper part of the outlet-side jacket part toward a position close to the inlet-side jacket part,
characterized in that the fourth jacket part is formed such that a sectional center of a tip closer to the inlet-side jacket part is positioned below a sectional center of the hot-water outlet port.

2. The combustion apparatus according to claim 1, wherein an upper surface of the fourth jacket part is formed in an inclined surface which is inclined upward from the said tip toward the upper surface of the portion having disposed therein the hot water outlet port of the outlet-side jacket part.

* * * * *